US009274528B2

(12) United States Patent
Wilson et al.

(10) Patent No.: US 9,274,528 B2
(45) Date of Patent: Mar. 1, 2016

(54) MARINE VESSEL CONTROL SYSTEM

(75) Inventors: Jim Wilson, White Lake, MI (US); Scott Snow, Commerce, MI (US)

(73) Assignee: Marine 1, LLC, Commerce, MI (US)

( * ) Notice: Subject to any disclaimer, the term of this patent is extended or adjusted under 35 U.S.C. 154(b) by 1212 days.

(21) Appl. No.: 12/510,950

(22) Filed: Jul. 28, 2009

(65) Prior Publication Data
US 2010/0030411 A1    Feb. 4, 2010

Related U.S. Application Data

(63) Continuation-in-part of application No. 11/426,028, filed on Jun. 23, 2006, now Pat. No. 7,565,876.

(60) Provisional application No. 60/693,284, filed on Jun. 23, 2005, provisional application No. 60/749,820, filed on Dec. 13, 2005.

(51) Int. Cl.
G05D 1/00    (2006.01)
G05D 1/08    (2006.01)

(52) U.S. Cl.
CPC .................................. G05D 1/0875 (2013.01)

(58) Field of Classification Search
CPC ........................................................ G05D 1/0875
USPC ........................................ 701/21; 440/12.51
See application file for complete search history.

(56) References Cited

U.S. PATENT DOCUMENTS

| | | | |
|---|---|---|---|
| 3,187,704 A | 6/1965 | Shatto, Jr. et al. | |
| 3,797,434 A * | 3/1974 | Matthews | 114/280 |
| 4,261,278 A | 4/1981 | Gaudin | |
| 4,757,971 A | 7/1988 | Mapes | |
| 5,647,780 A | 7/1997 | Hosoi | |
| 5,941,189 A | 8/1999 | Johansson | |
| 6,273,771 B1 | 8/2001 | Buckley et al. | |
| 6,435,123 B1 * | 8/2002 | Odegard | 114/274 |
| 7,565,876 B2 | 7/2009 | Wilson et al. | |
| 2003/0191562 A1 * | 10/2003 | Robertson et al. | 701/21 |
| 2004/0195440 A1 | 10/2004 | Liu | |
| 2005/0075016 A1 | 4/2005 | Bertetti et al. | |
| 2005/0239351 A1 * | 10/2005 | Darby et al. | 440/12.51 |

FOREIGN PATENT DOCUMENTS

| | | |
|---|---|---|
| EP | 0201309 A2 | 11/1986 |
| GB | 494285 A | 10/1938 |
| GB | 994995 A | 6/1965 |

(Continued)

*Primary Examiner* — Redhwan k Mawari
*Assistant Examiner* — Rodney P King

(57) ABSTRACT

A marine vessel control system that includes at least one primary marine propulsory mechanism providing a thrust vector and being movably attached to the vessel. An actuating system is coupled to the at least one primary marine propulsory mechanism manipulating the orientation of the thrust vector. At least one servo control is linked with the actuating system. At least one attitude sensor provides a signal that indicates the attitude of the vessel. A central control computer is operatively coupled to the actuating system, the servo control and the attitude sensor. The central control computer controls the actuation of the at least one primary marine propulsory mechanism's thrust vector in response to the signal from the attitude sensor indicating the attitude of the vessel. The attitude, stability and motion damping and at least one of the pitch, roll and yaw axes of the vessel is controlled.

23 Claims, 14 Drawing Sheets

(56) References Cited

FOREIGN PATENT DOCUMENTS

| | | |
|---|---|---|
| GB | 2262718 A | 6/1993 |
| JP | S6140918 A | 2/1986 |
| JP | S63301196 A | 12/1988 |
| JP | H01262291 A | 10/1989 |
| JP | H01285486 A | 11/1989 |
| JP | H058792 A | 1/1993 |
| JP | H0640391 A | 2/1994 |
| JP | 2001294197 A | 10/2001 |

\* cited by examiner

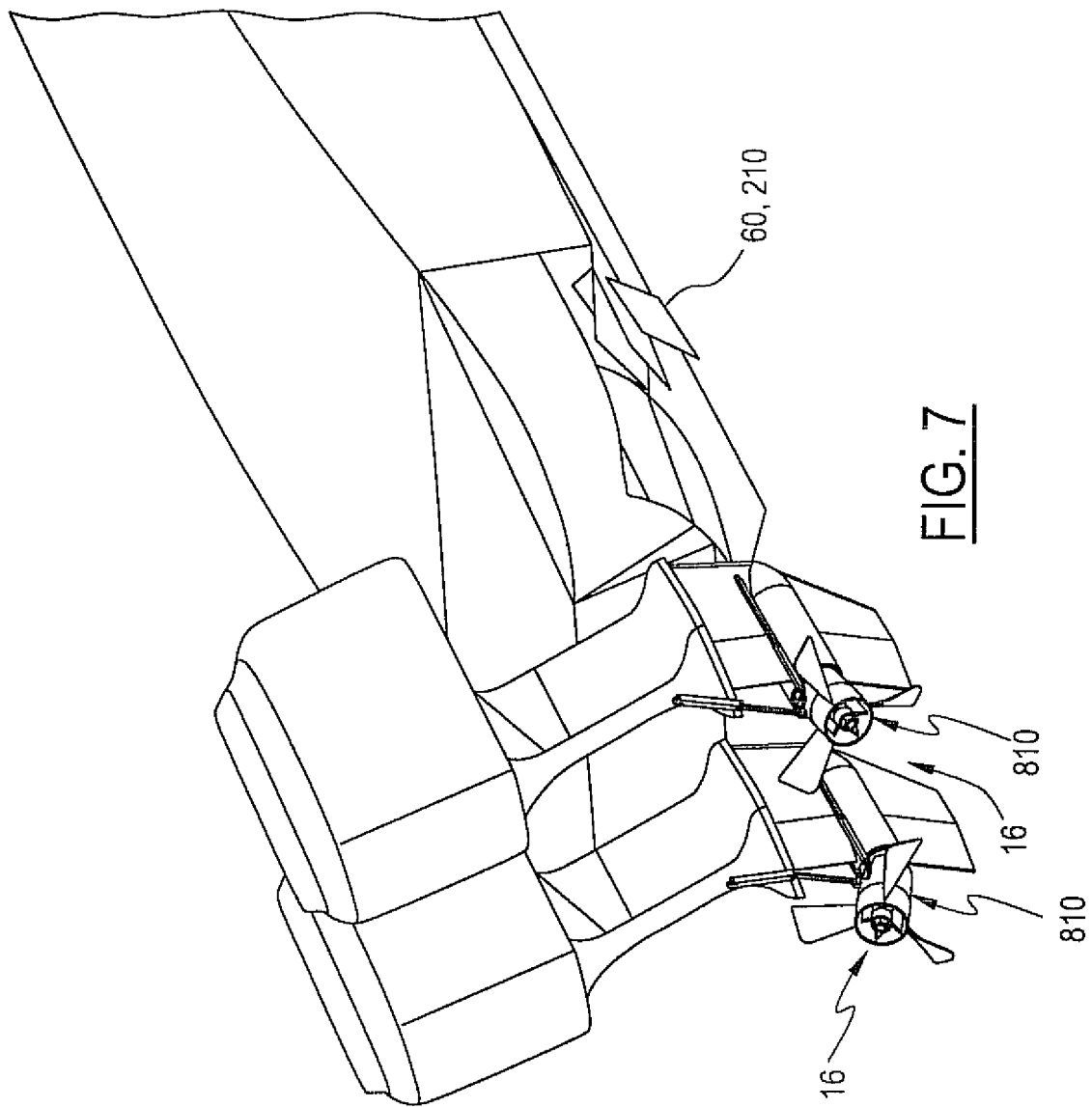

MARINE VESSEL CONTROL SYSTEM

CROSS-REFERENCE TO RELATED APPLICATIONS

This application is a continuation-in-part of U.S. patent application Ser. No. 11/426,028 filed Jun. 23, 2006, which claims priority of U.S. Provisional Application No. 60/693,284 filed Jun. 23, 2005, and U.S. Provisional Application No. 60/749,820 filed Dec. 13, 2005 which are incorporated herein by reference.

FIELD OF THE INVENTION

The invention relates to marine vessel control systems.

BACKGROUND OF THE INVENTION

Marine vessels typically include propulsion mechanisms that are capable of propelling a vessel through a body of water. Some propulsion mechanisms are capable of being manipulated to steer the marine vessel. For example, a waterjet nozzle mechanism may be rotated around its vertical axis to steer a vessel having the waterjet attached. Some propulsion mechanisms are capable of being manipulated to both steer and trim the marine vessel. For example, an outboard mechanism may be rotated around its vertical axis to steer a vessel and rotated around its transverse axis to trim a vessel having the outboards attached.

Marine vessels may be subject to various dynamic forces generated by its propulsion system as well as the dynamic environment in which it operates. For example, forces from the action of waves or wind against the vessel may apply dynamic inputs to the motion of a vessel. Additionally, the dynamic forces generated destabilize the vessel's attitude as well as affect the overall performance of the vessel.

There is therefore a need in the art for an active attitude control, stabilization and motion damping system for a marine vessel.

SUMMARY OF THE INVENTION

In one aspect, there is disclosed a marine vessel control system that includes at least one primary marine propulsory mechanism providing a thrust vector and being movably attached to the vessel. An actuating system is coupled to the at least one primary marine propulsory mechanism manipulating the orientation of the thrust vector. At least one servo control is linked with the actuating system. At least one attitude sensor provides a signal that indicates the attitude of the vessel. A central control computer is operatively coupled to the actuating system, the servo control and the attitude sensor. The central control computer controls the actuation of the at least one primary marine propulsory mechanism's thrust vector in response to the signal from the attitude sensor indicating the attitude of the vessel. The attitude, stability and motion damping and at least one of the pitch, roll and yaw axis of the vessel is controlled.

In another aspect, there is provided a marine vessel control system that includes at least one primary marine propulsory mechanism that provides a thrust vector and is movably attached to the vessel. At least one hydrodynamic effector is movably attached to the vessel. At least one servo control is linked with the at least one primary marine propulsory mechanism and the at least one vessel hydrodynamic effector. An actuating system is coupled to the at least one primary marine propulsory mechanism manipulating the orientation of the thrust vector. An actuating system is also coupled to the vessel hydrodynamic effector manipulating the orientation of the vessel hydrodynamic effector. At least one attitude sensor provides a signal indicating the attitude of the vessel. A central control computer is operably coupled to the actuating system servo control and the attitude sensor and controls the actuation of the at least one primary marine propulsory mechanism and/or the at least one hydrodynamic effector to adjust the thrust vector of the at least one primary marine propulsory mechanism and/or a position of the vessel hydrodynamic effector in response to the signal from the attitude sensor. The attitude, stability and motion damping in at least one of the pitch, roll and yaw axes of the vessel is controlled.

BRIEF DESCRIPTION OF THE DRAWINGS

FIG. 7 is a perspective view detailing differential thrust vectors of an adjustable prop propulsory mechanism;

DETAILED DESCRIPTION OF THE PREFERRED EMBODIMENTS

Differential and differentially are defined within this document as unequal, off center and/or involving differences in the angle, speed, rate, direction, direction of motion, output, force, moment, inertia, mass, balance, application of comparable forces, etc.

Dynamic and dynamically may be defined as the immediate action that takes place at the moment they are needed. Immediate, in this application, means that the control action occurs in a manner that is responsive to the extent that it prevents or mitigates vessel motions and attitudes before they would otherwise occur in the uncontrolled situation. Someone skilled in the art understands the relationship between sensed motion parameters and required effector response in terms of the maximum overall delay that can exist while still achieving the control objectives. Dynamic may be used in describing interactive hardware and software systems involving differing forces and may be characterized by continuous change and/or activity. Dynamic may also be used when describing the interaction between a vessel and the environment. As stated above, marine vessels may be subject to various dynamic forces generated by its propulsion system as well as the environment in which it operates.

Figure 1:
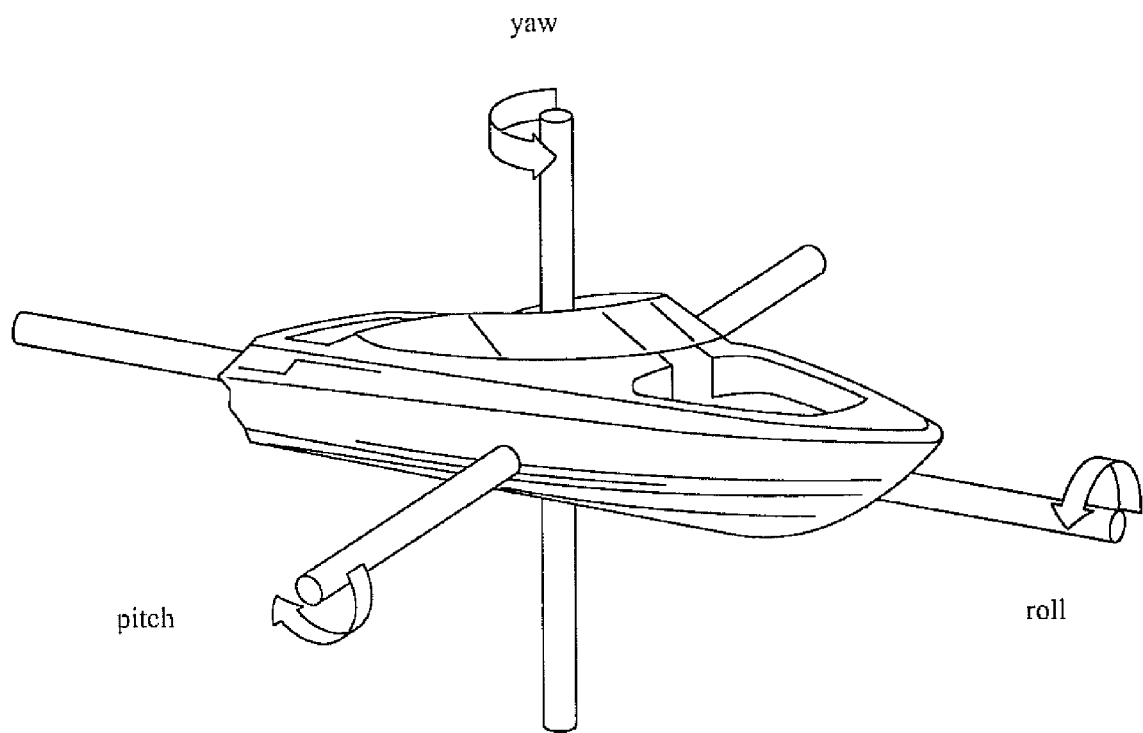
FIG. 1 is a graphical depiction of a vessel showing the pitch, roll and yaw axes.

A vessel attitude may be defined as relative to three rotational axes, as detailed in FIG. 1 including pitch attitude or rotation about the Y, transverse or sway axis, roll attitude or rotation about the X, longitudinal or surge axis, and yaw attitude or rotation about the Z, vertical or heave axis.

Someone skilled in the art understands that active marine vessel damping is the attenuation of the value of a resonant response, such as the pitch, roll and yaw of the vessel. Someone skilled in the art understands that a marine vessel active stabilization, motion damping and attitude control system is a system selected, sized and integrated, based on a vessel's specific design, to achieve the effector rates required for damping pitch and/or roll and/or yaw.

Someone skilled in the art understands, for motion damping to be achieved, effector angular motion rates may generally be at least 10 times the vessel angular motion rate in the pitch and roll axis. For example, angular motion rates of 4 degrees per second may be typical of conventional high performance planing craft. This means that effector angular motion rates of 40 degrees per second may be used to achieve motion damping for this specific performance class of planing craft.

Someone skilled in the art understands, a hydrofoil, planing device and/or interceptor produces control forces based on a speed-squared relationship and are therefore much more effective at higher speeds than lower speeds. For example, a trim tab produces 4 times the amount of force at 20 knots than it does at 10 knots.

Referring to the figures, there is shown a marine vessel control system 14 that includes at least one primary propulsory mechanism 16 that provides a thrust vector 18. The at least one primary propulsory mechanism 16 is movably attached to the vessel. Various structures may be utilized to movably attach the primary propulsion mechanism to the vessel, as will be described in more detail below. An actuating system 20 is coupled to the at least one primary marine propulsory mechanism 16 manipulating the orientation of the thrust vector 18. At least one servo control 22 is linked with the actuating system 20. At least one attitude sensor 24 provides a signal that indicates the attitude of the vessel. A central control computer 26 is operably coupled to the actuating system 20, the servo control 22 and the attitude sensor 24. The central control computer 26 controls the actuation of the at least one primary marine propulsory mechanism's thrust vector 18 in response to the signal from the attitude sensor 24. The attitude, stability and motion damping in at least one of the pitch, roll and yaw axes of the vessel is controlled.

Figure 2:
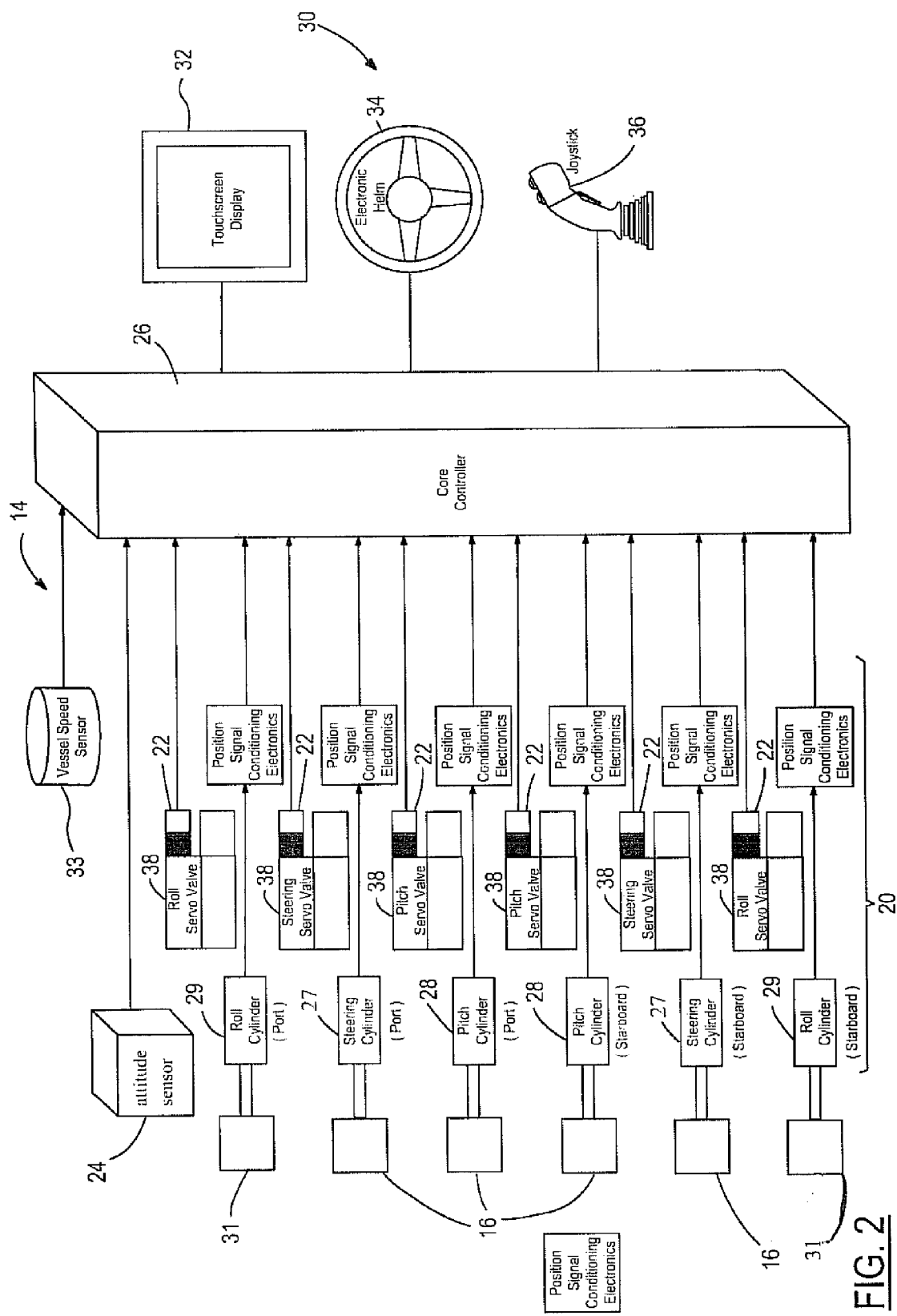
FIG. 2 is a graphical diagram detailing the relationship of the central control system with dual primary propulsion mechanisms, dual hydrodynamic effectors, attitude sensor, speed sensor, servo control and inputs to the central computer.

Referring to FIG. 2, there is shown a diagram of a marine vessel control system 14. As stated previously, the marine vessel control system 14 includes at least one primary marine propulsory mechanism 16 that may be embodied by various designs as will be discussed in the various embodiments detailed below. The at least one primary propulsory mechanism 16 is coupled to an actuating system 20. The depicted actuating system in FIG. 2 includes two separate actuators 27, 28 for each of the pitch, and yaw axes for two primary marine propulsory mechanisms 16. It should be realized that when two or more thrust vectors are differentially controlled around their individual pitch axes, they can be used to control a vessel's roll axis. In the depicted embodiment each of the actuators 27, 28 are coupled to a servo control 22 that is linked with the central control computer 26. Additionally, an attitude reference sensor 24 is also coupled to the central control computer 26. The attitude reference sensor 24 generates a signal indicating the attitude of the vessel. Various attitude reference sensors 24 that measure the rate changes and angles of the attitude of the vessel may be utilized. There are also included actuators 29 for the roll axis that are coupled to hydrodynamic effectors 31. As described above, the actuators 29 are coupled to a servo control 22 that is connected to the central control computer 26. Further, an attitude reference sensor 24 is also coupled to the central control computer 26.

The central control computer 26 may include a gain setting that may be controlled by an operator or may be automatically adjusted by the central control computer 26 as a speed of the vessel changes. In one aspect the central control computer may link the gain settings relative to the vessel's speed which is detected by a speed sensor 33. For example, at lower speeds the central control computer 26 may increase the gain setting to provide greater control as forces produced by hydrodynamic effectors 31 are speed dependent, increasing with speed as a function of velocity-squared. Thus higher gain settings at low speeds may compensate for lower forces produced by the hydrodynamic effectors 31. As the vessel speed increases and the force input from the hydrodynamic effectors increase, gain settings may be decreased by the central control computer 26. Vessel speed information may be provided by GPS, Doppler, paddle wheel, or other speed sensing devices.

The central control computer 26 is also linked with various input devices 30 that may be utilized by a user to specify control parameters. In the depicted embodiment input devices 30 including a touch screen display 32, an electronic helm 34 and a joystick control 36 that are linked with the central control computer 26. It should be realized that various input mechanisms beyond those shown in the depicted embodiment may be utilized. For example, known input devices including keyboards, mice, thumb wheels, buttons, toggles, etc., may also be utilized. Examples of system parameters that an operator can control or adjust through the user interface include: the selection of automatic or manual vessel control system operating modes; the selection of a desired trim and list of the vessel such as the static trim and list attitude that the vessel control system attempts to maintain, the selection of the gain setting for pitch and roll control functions to modify how hard the vessel control system attempts to reduce pitch and roll motions, the selection of the static bias angle or baseline average angle of attack, the selection of the desired turn bank mode or how the vessel reacts in a turn between a normal coordinated turn and a flat turn.

Figure 3:
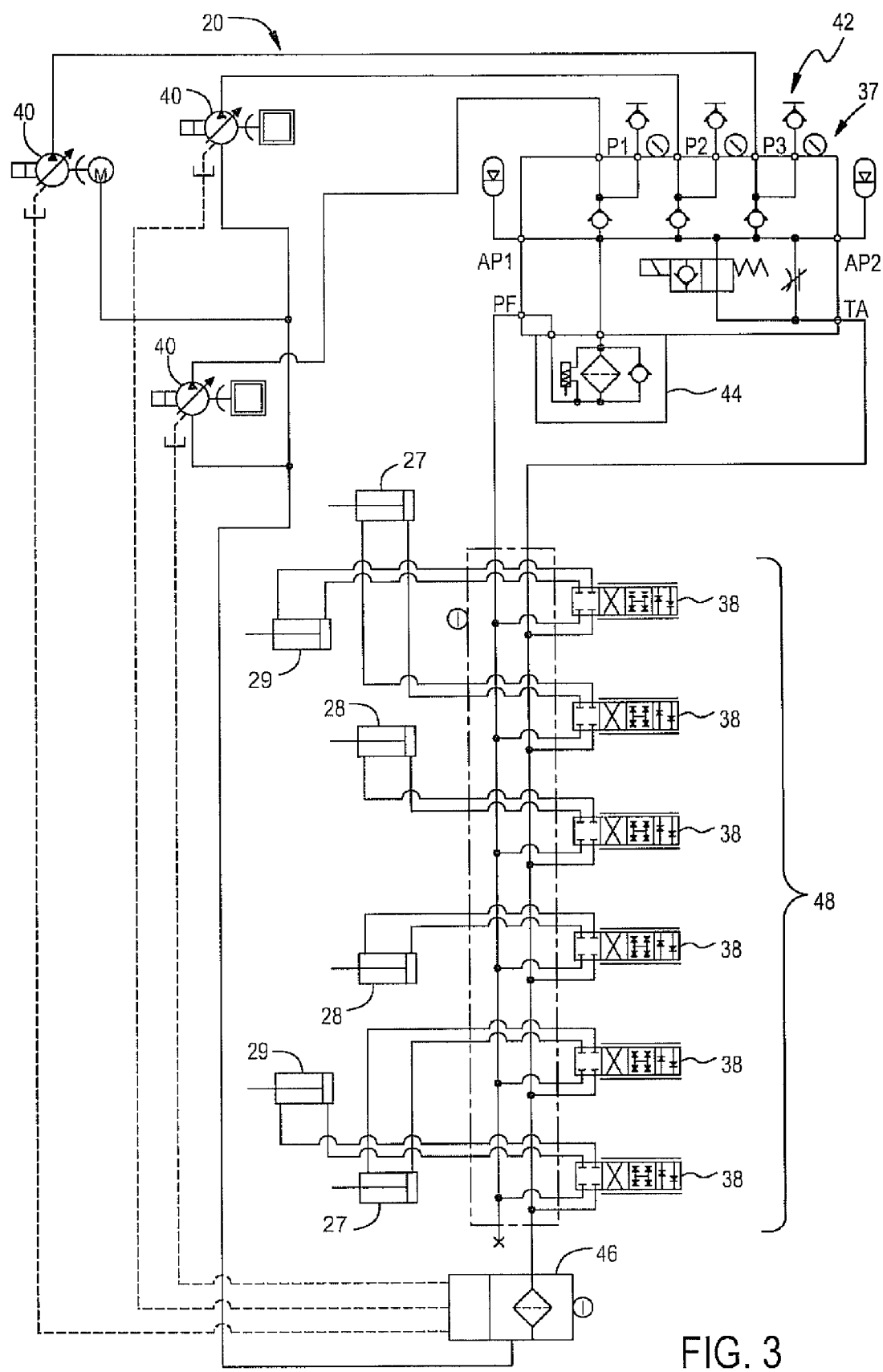
FIG. 3 is a diagram of one embodiment of an actuating system for dual primary propulsory mechanisms and dual hydrodynamic effectors.

Referring to FIGS. 2 and 3, there are shown diagrams detailing one embodiment of an actuating system 20 that is coupled to the primary marine propulsory mechanism 16 and to hydrodynamic effectors 31. In the depicted embodiment, a hydraulic actuating system is shown. It should be realized that various other actuating mechanisms including electric actuators as well as pneumatic actuators may also be utilized.

Again referring to FIG. 3, there is shown an actuating system 20 that includes a hydraulic system 37 linked with valves 38 connected with the actuators 27, 28, 29. In the depicted embodiment, variable displacement pumps 40 provide pressurized fluid to accumulators 42 and a high pressure filter 44. A reservoir tank 46 is linked with the variable displacement pumps 40 to provide a source of fluid for the system. The high pressure filter 44 may be linked with a six station manifold block 48 supporting the valves 38 in the depicted embodiment. The six station manifold block may be utilized to control the roll, steering and pitch actuators 29, 27, 28 for a marine vessel control system having two primary propulsory mechanisms 16. Each of the primary propulsion mechanisms 16 may include a pitch vector valve and steering valve to control actuation of the actuators 28 and 27 based upon the signal from the central control computer 26. Each of the hydrodynamic effectors 31 may include a valve 38 to control actuation of the actuator 29 based upon the signal from the central control computer 26. As stated above, the central control computer 26 processes the input from the user in conjunction with the signal sent from the attitude reference unit 24 to adjust the position of the actuators 27, 28, 29. In this manner, the attitude of the vessel as well as the stability and motion damping of the vessel in at least one of the pitch, roll and yaw axes of the vessel may be controlled.

Referring to FIGS. 4-6 and 8 the primary propulsion mechanism 16 may include outboard motors 116. A four-bar-linkage support bracket 117 may be provided to permit rapid adjustment of the thrust vector angle and to permit sufficient adjustment of the trim. While a four bar linkage is shown, it should be realized that other alternative mechanisms may be utilized. The bracket may include the support arms 118 extending from a transom plate 119 and an engine mounting plate 120 pivotally mounted to the support arms 118. The transom plate 119 may be mounted to the transom 122 and the actuator 28 may extend from a lower portion of the support arms 118 to the arms 121 attached to the mounting plate 120. The actuator 28 may be any suitable actuator including the hydraulic actuator described above or may be electrical or pneumatic. In one aspect, the actuator 28 may be capable of thrust vector angle changes in the magnitude of 40 degrees per second or greater. The outboard motor 116 may be mounted to the mounting plate 120. The length of the arms 117, 118, 121 may be selected such that the outboard motor 116 may be moved towards the transom a sufficient distance to permit the thrust vector created by the propeller shaft angle to provide for sufficient adjustment of the trim. The outboard motors 116 may be differentially moved to provide stability and motion damping of the vessel in at least one of the pitch, roll and yaw axes. Various primary propulsion mechanisms such as adjustable props and water jets as depicted in FIGS. 4B, 4C and 7 may be differentially controlled to provide thrust vectors for providing stability and motion damping of the vessel in at least one of the pitch, roll and yaw axes will be described in more detail below.

Figure 4A:
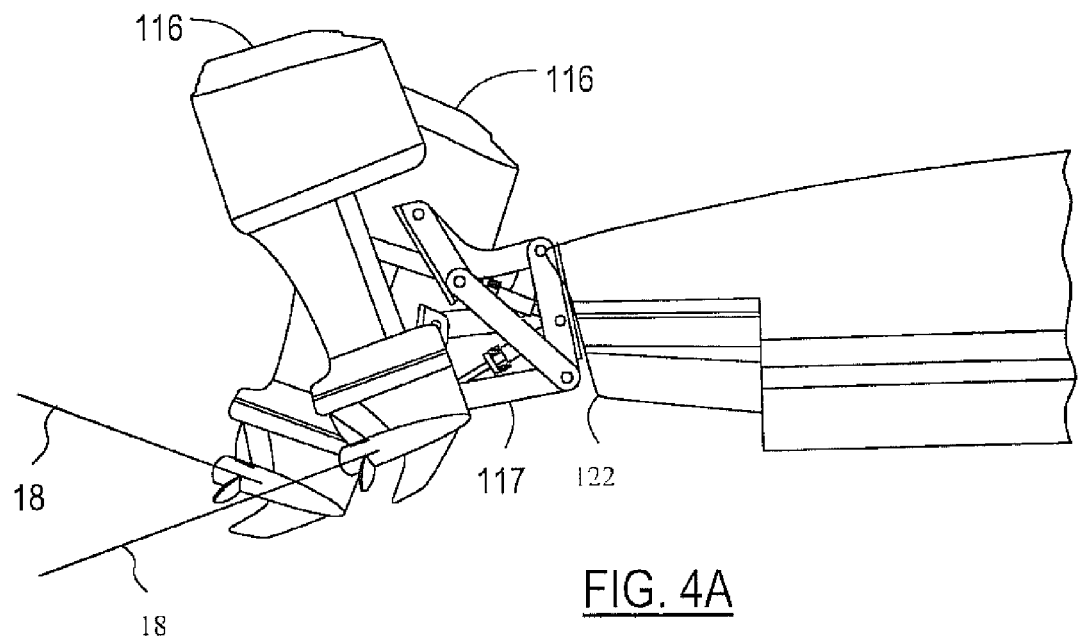
FIG. 4 is a side view detailing differential thrust vectors of a dual outboard propulsory mechanism.
Figure 4B:
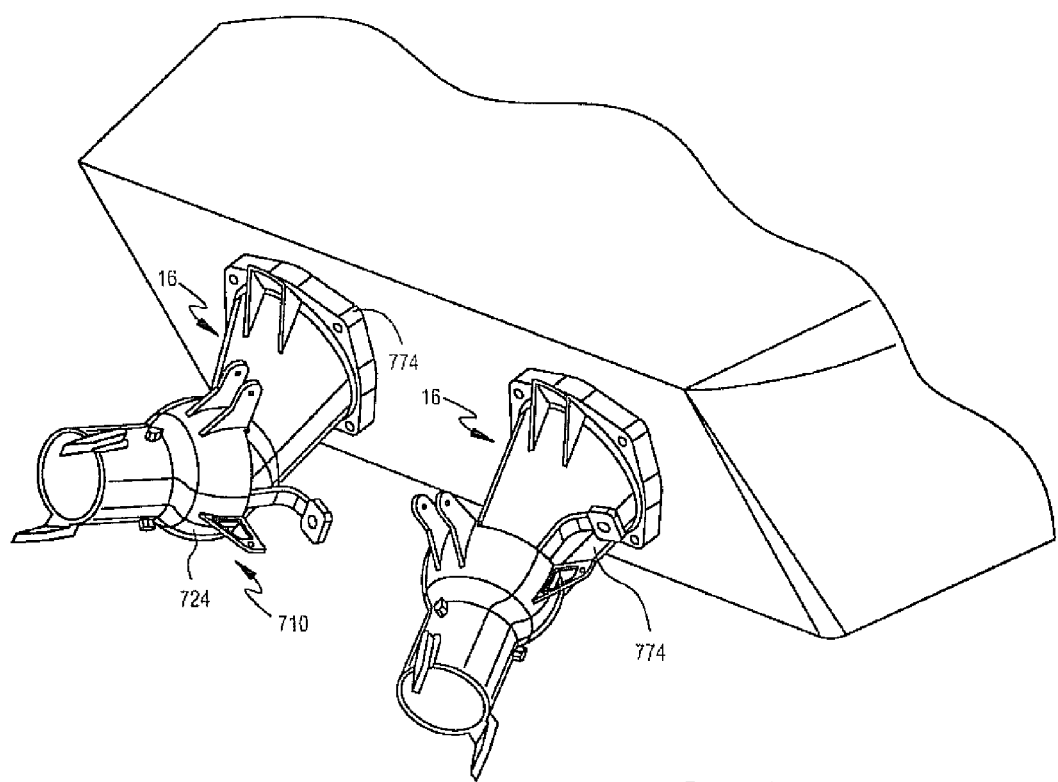
Figure 4C:
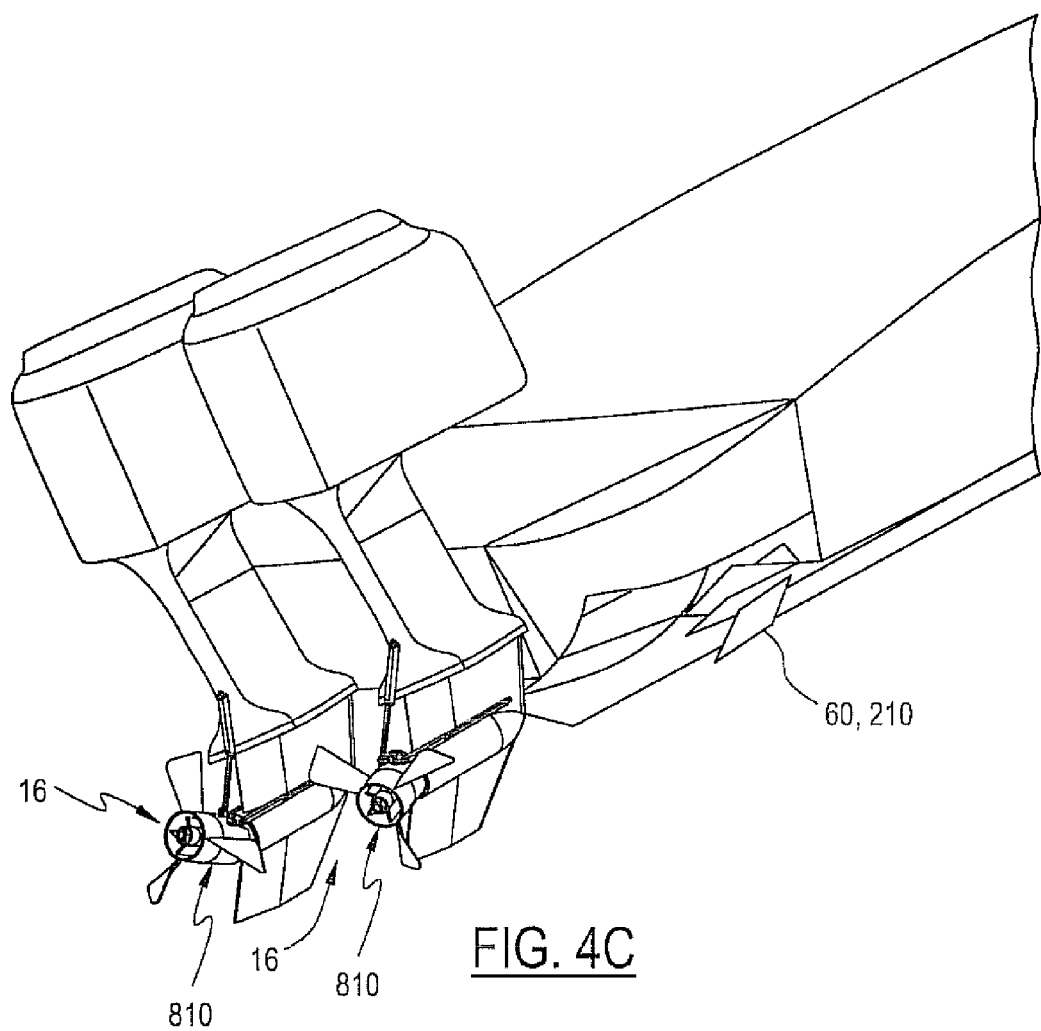
Figure 5:
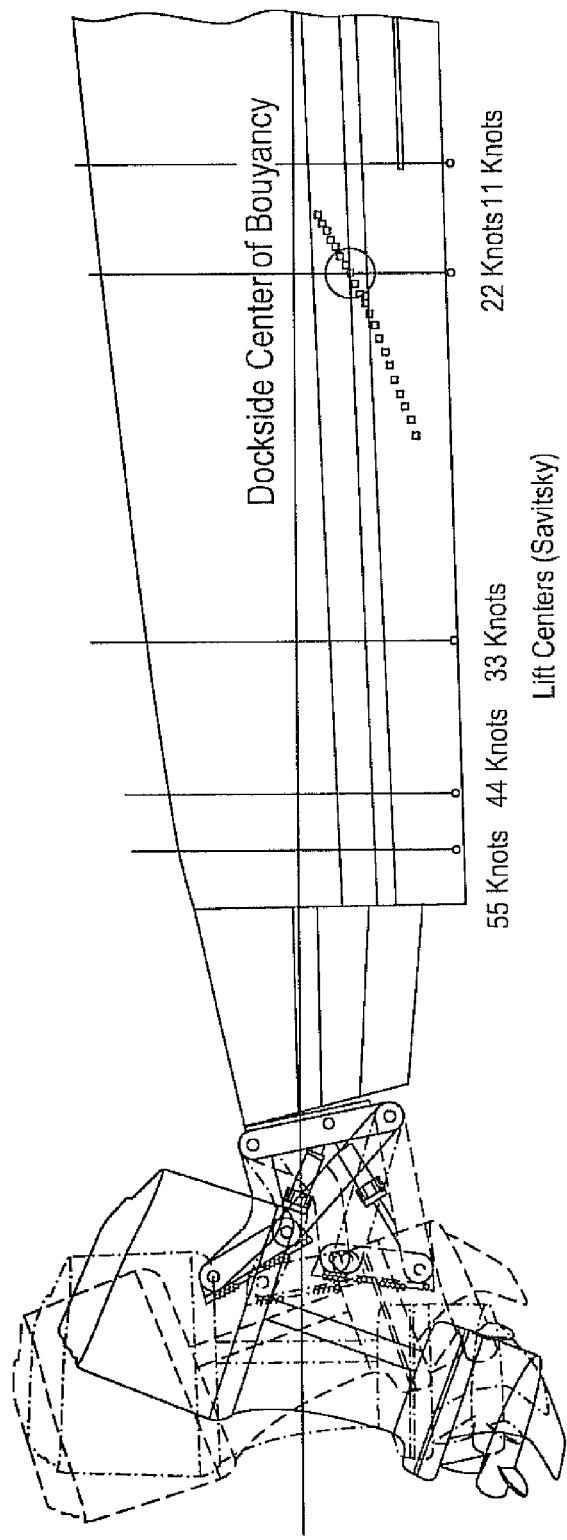
FIG. 5 is a side view of a vessel detailing differential thrust vectors relative to a center of buoyancy for a dual outboard propulsory mechanism.
Figure 6:
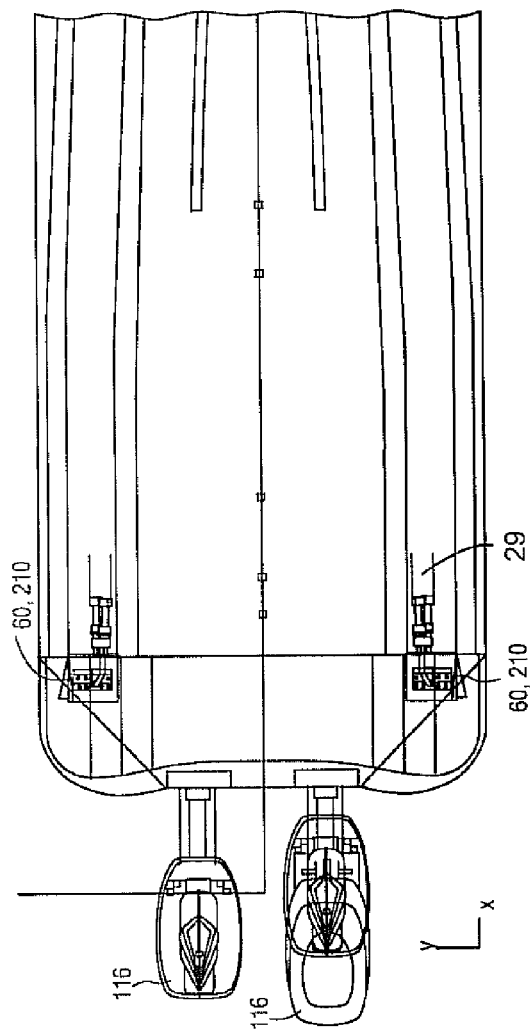
FIG. 6 is an overhead view of a vessel including dual outboard propulsory mechanisms and tabs.
Figure 8B:
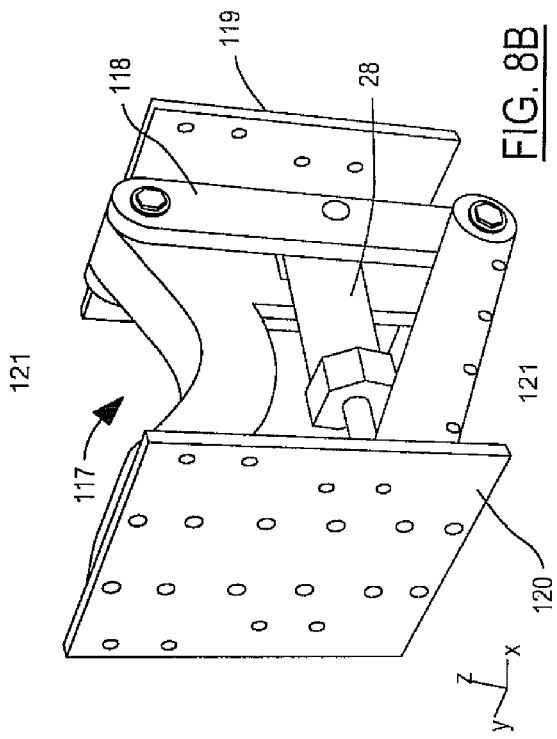
FIG. 8 is a perspective view detailing differential thrust vectors of a dual water jet propulsory mechanism.
Figure 8D:
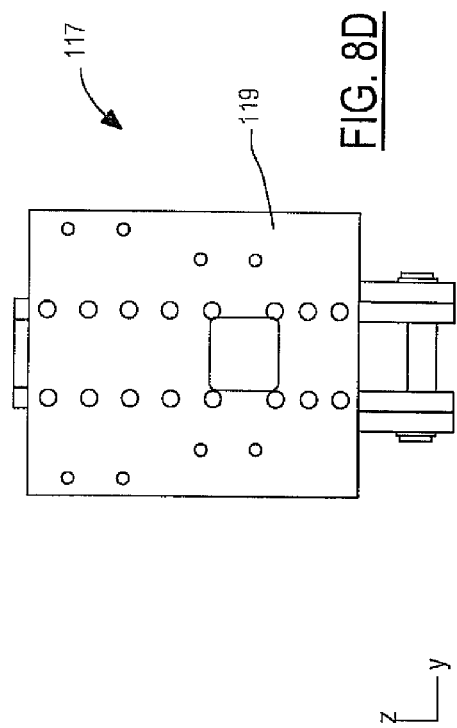
Figure 8A:
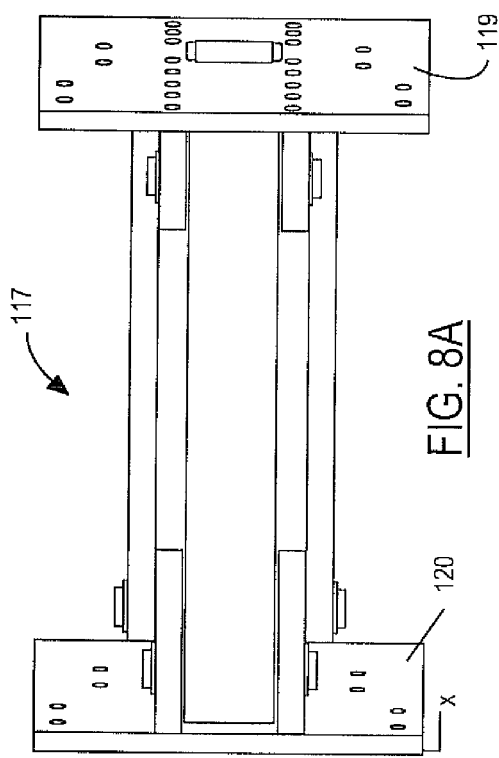
Figure 8C:
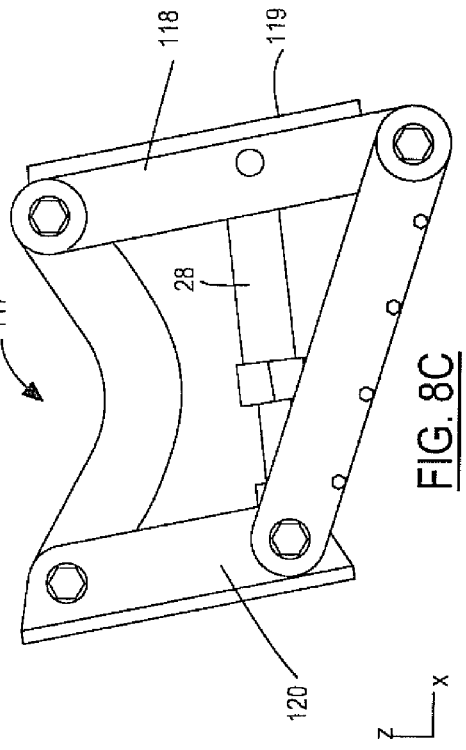

Referring to FIGS. 4C, 6, 7 and 9, there are shown various embodiments of hydrodynamic effectors 60, 210 and 310 including tabs and interceptors. In FIGS. 4C, 6 and 7, tabs 60, 210 are shown on a vessel including dual outboard propulsion mechanisms 16. The hydrodynamic effectors 60, 210 may be hydrofoils, planing devices and/or interceptors. The tabs 60 may be coupled to the actuators 29. The tabs/interceptors 60, 310 may be coupled to the central control computer 26 as described above. The tabs 60, 210 may be, differentially articulated to control and damp roll and/or pitch of the vessel. The central control computer 26 may determine when to actuate the hydrodynamic effector 60 and the primary propulsion mechanism 16 to maintain a desired user defined vessel operating attitude or characteristic response.

Figure 9:
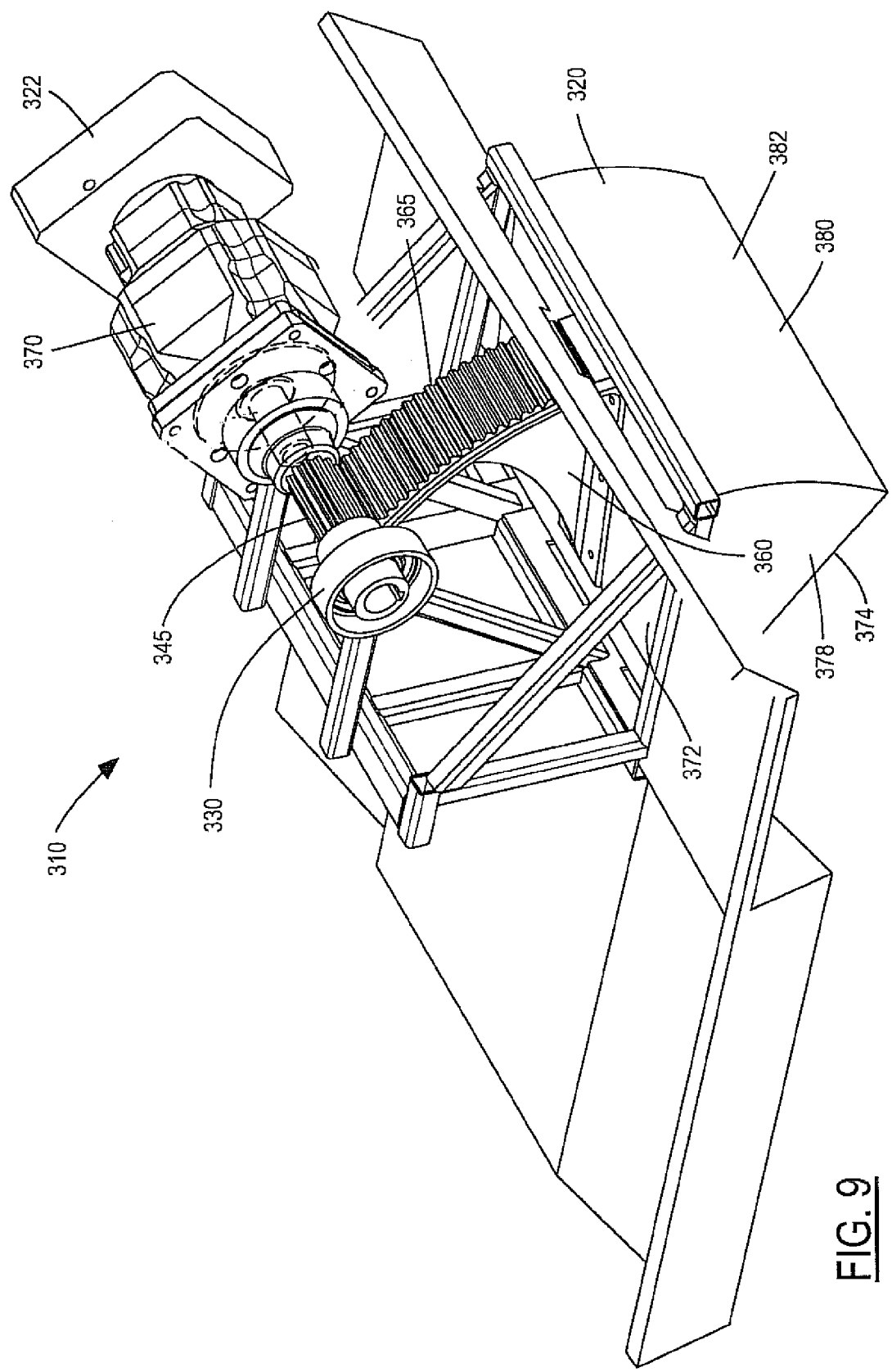
FIG. 9 is a perspective view of an embodiment of a tab/interceptor mechanism.

Referring to FIG. 9 there is shown another embodiment of a tab 310. In the depicted embodiment, the tab assembly 310 may include an electric actuator having a driveshaft that is connected to a drive gear 345. At least one bearing supports the driveshaft in the support structure 330. In one aspect, the at least one bearing includes a seal preventing water disposed within a hull cavity that houses the tab assembly 310 from exiting the cavity. Additionally, the seal may isolate the electric actuator that is positioned on a dry side of the hull cavity from the water. A position sensor may be attached to the drive shaft 340 to monitor a position of the tab 320 relative to the hull cavity. The position sensor may include a potentiometer or equivalent device used to communicate position data to the central control computer 26.

The tab assembly 310 may include a driven member 360 that is attached to the tab 320 and is operably linked with the drive gear 345. In one aspect, the driven member 360 may include a flexible gear portion 365 attached to the driven member 360 and is meshed with the drive gear 345. In one aspect, the interface between the drive gear 345 and driven member 360 is a soft interface such that the gear teeth of the flexible gear portion 365 will shear upon application of a predetermined force preventing damage to a gearbox 370 of the electric actuator as well as the driveshaft and hull cavity. Additionally, the soft interface provides a joining of the drive gear 345 and driven member 360 without the need for lubrication. Such a dry relationship is advantageous when used in a wet environment within the hull cavity.

In one aspect the tab 320 may include a generally planar top 372, bottom 374, and side 378 surfaces linked by a curved trailing surface 380 defining a wedge-shaped body 382. In one aspect, the tab 320 may include an inner support structure surrounded by an outer skin 86. In one aspect, the wedge shaped body 382 may include a buoyant material positioned within an interior of the wedge-shaped body 382 providing support for the outer skin as well as decreasing an overall weight of the tab 320. Various materials such as closed and open cell foams may be used in conjunction with additional support structure to withstand loads applied to a tab 320 during actuation and to provide buoyancy.

In another aspect, a removable plate may be attached to a water contacting surface of the tab 320. The removable plate may include characteristics for modifying the performance characteristics of the tab 320. For example, the removable plate may have various characteristics including concave shapes, convex shapes, and strakes of varying dimension and position, as well as shape surfaces that match the contour of a watercraft hull. In this manner, the removable plate may be tailored to provide various design and performance characteristics that affect the overall performance of a watercraft having a tab assembly 310. Additionally, the removable plate can be swapped out with another plate to provide various configurations that may be interchangeable to affect the performance of a watercraft.

The tab assembly 310 may include a hinge assembly that is linked to the hull cavity and the tab for pivotal movement of the tab 320 relative to the hull cavity. The hinge assembly may be positioned on a forward edge of the hull cavity and linked with a forward portion of the tab 320. In one aspect, the hinge assembly may be in two pieces such that one piece is attached to a bottom surface 374 of the tab 320 at the forward edge and is mated with a second piece attached to the support structure 330 disposed within the hull cavity. A hinge pin may be positioned along a center line of the hinge allowing pivotal movement of the tab 320 relative to the support structure 330 and hull cavity.

Figure 10:
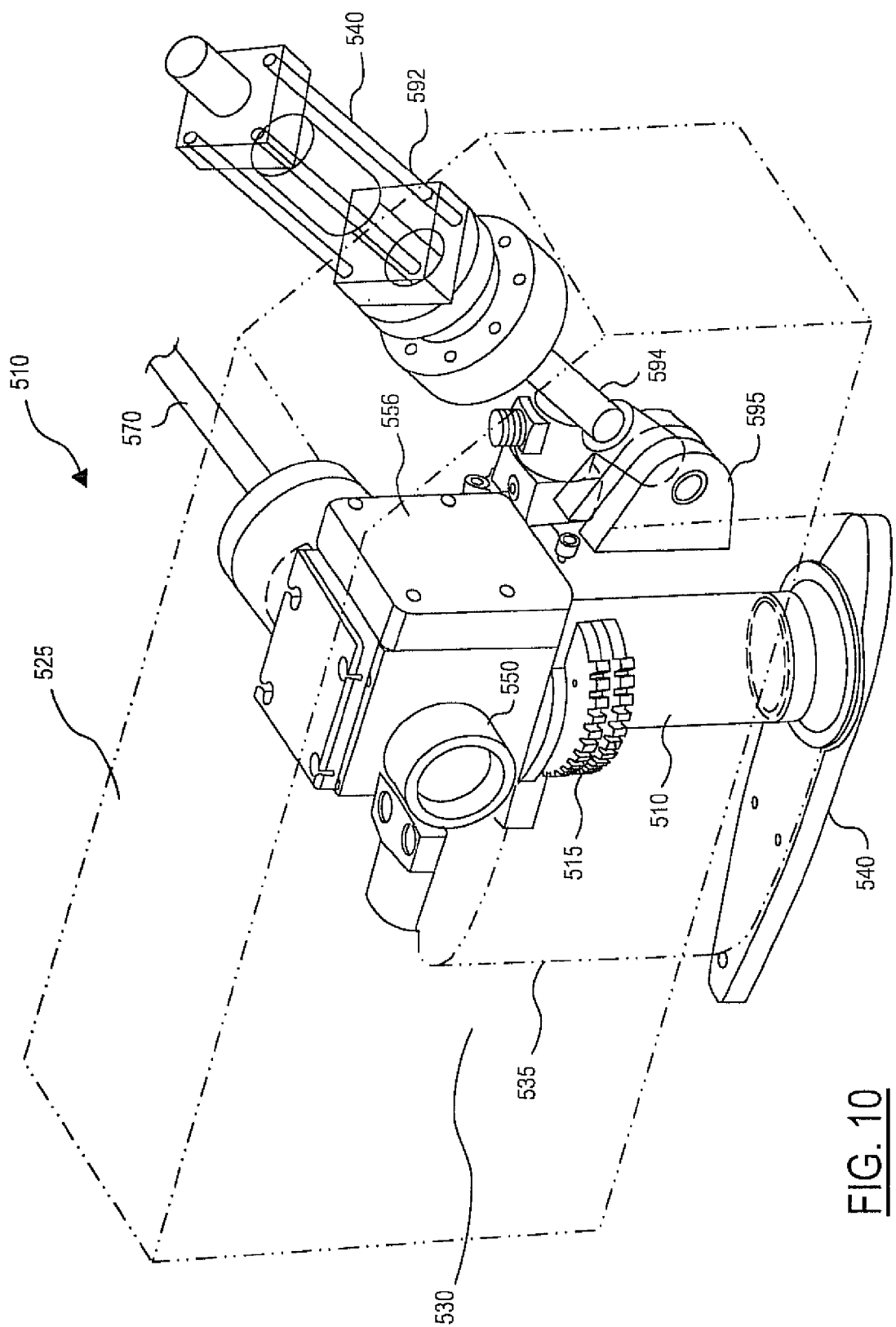
FIGS. 10, 10B and 10C is a perspective view of an embodiment of a primary marine propulsory mechanism capable of simultaneous pitch (transverse) axis and steer (vertical) axis inputs.
Figure 10B:
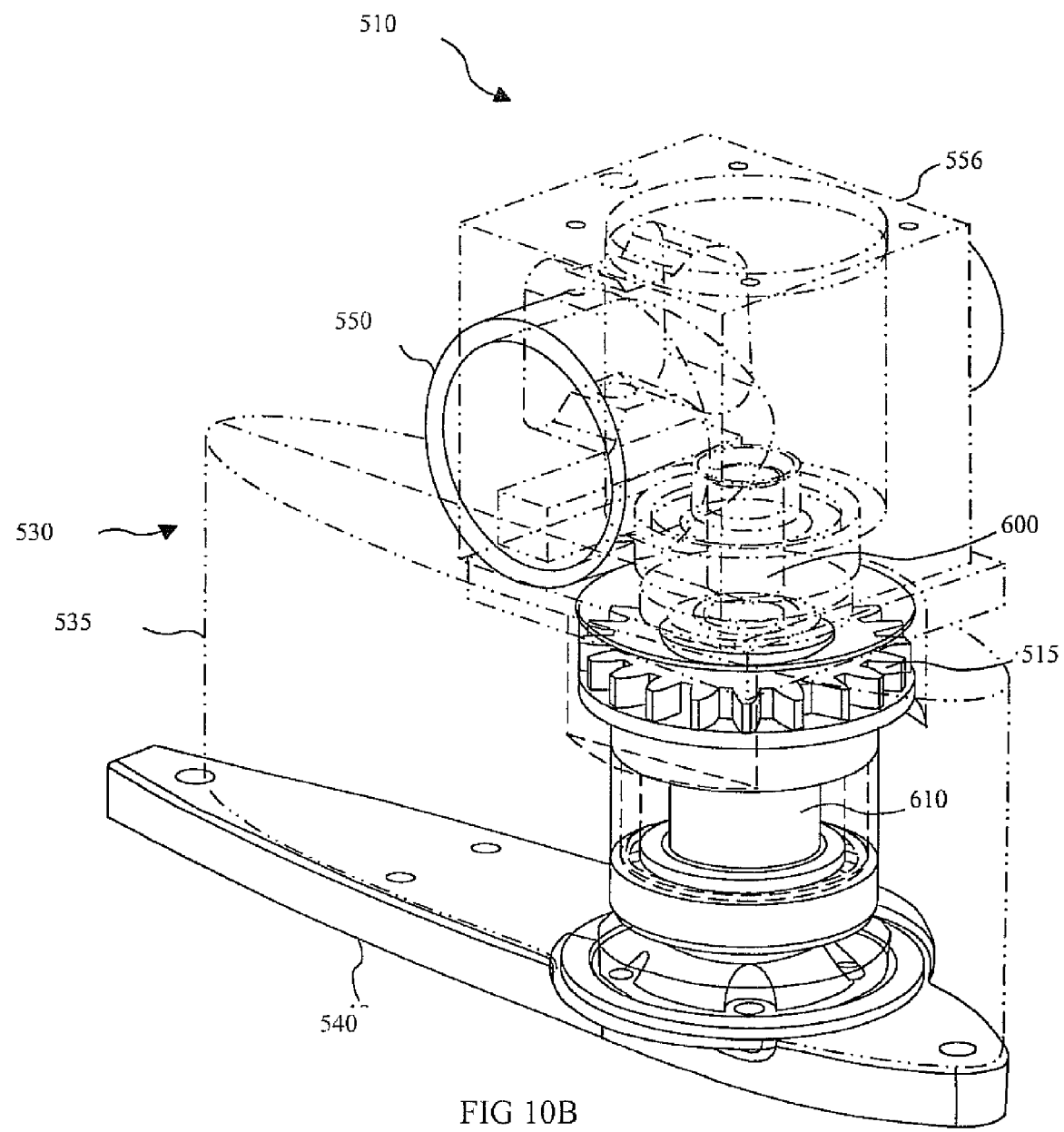
Figure 10C:
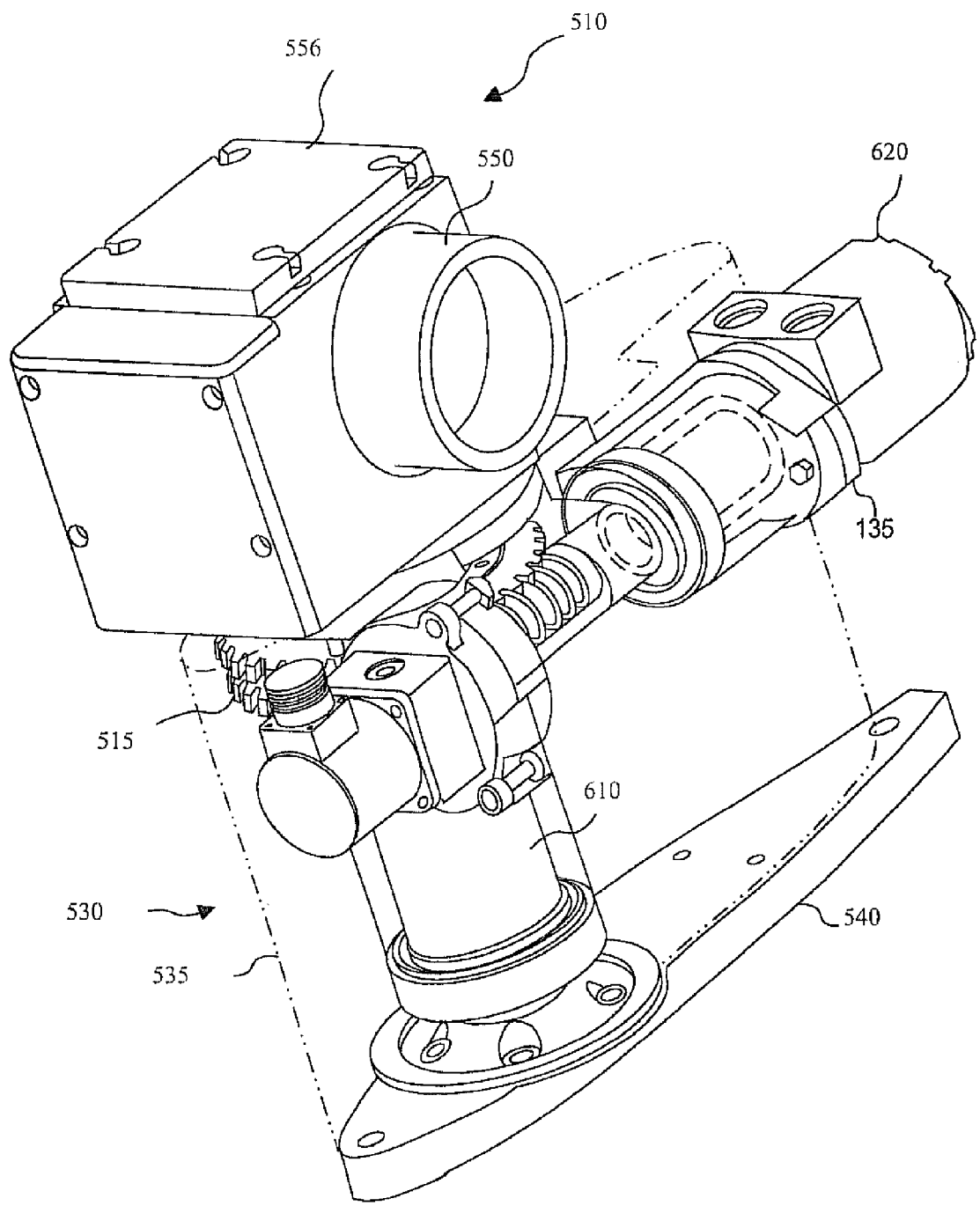

Referring to FIG. 10, there is shown another embodiment of a primary propulsion mechanism 16 that includes upper and lower units. In the depicted embodiment, the marine propulsion system 510 includes a vessel hull having a transom formed at the aft portion of the hull. The vessel hull includes a cavity 525 formed therein forward or adjacent to the transom. A drive assembly 530 includes upper 535 and lower unit 540. The upper unit 535 of the drive assembly 530 may be pivotally mounted within the hull-cavity 525 for adjusting a pitch of the drive assembly 530 about a pitch (transverse) axis. The lower unit 540 of the drive assembly 530 may be attached to the upper unit 535 of the drive assembly 530 and includes a propulsory member for driving the vessel hull.

The drive assembly 530 may be mounted external of the vessel hull 515 within a watertight, solid structure hull-cavity 255 that is completely sealed off from all compartments internal to the vessel hull 515, such as an engine room. The only penetration required through the watertight hull-cavity 515 is for trunnion hubs 550 and hydraulic/electrical/fiber-optic lines/cables required to service the electro-hydraulic control activated hydraulic cylinder(s) and hydraulic motors and sensors responsible for the drive pitch actuation, steering actuation and drive position indication, as will be discussed in more detail below.

Two trunnion hubs 550 may be included per drive assembly 530, one on each side of the drive's upper unit 535 gearbox 556. Mounting configuration options include either one solid trunnion hub 550 and one hollow center cavity trunnion hub to allow for the passage of one driveshaft 570, or two hollow center cavity trunnion hubs 550 to allow for the passage of two driveshafts 570, one per side of the drive assembly 530. Drive assemblies 530 can be coupled to one or two driveshafts 570 depending on design and configuration. The driveshafts 570 engage the drive assembly 530 by entering through the hollow center cavity of a trunnion hub 550. The drive's upper unit 535 gearbox 556 is designed to accept only 1 driveshaft 565 per hollow center cavity trunnion 550, or in other words, a maximum of one driveshaft per side of a drive assembly 530. The drive assembly 530 may be driven from either side or simultaneously through both sides.

The marine drive system 510 is positive-pitch and negative-pitch articulated by a pitch actuator 590, such as an electro-hydraulic control activated hydraulic cylinder 592; however, the pitch actuator may be any suitable mechanism capable of pivoting the drive assembly 530. The electro-hydraulic control activated hydraulic cylinders 592 responds to precise positioning instructions received from the central control computer 26. The pitch control hydraulic cylinders 592 may include either mechanical or electrical pumps that can be used to generate and sustain the hydraulic pressure necessary for articulating the drive assembly 530. In the case of a single-actuator pitch control configuration, the ideal mounting position for the pitch control hydraulic cylinder 592 is forward of the drive assembly 30 toward the vessel's bow at approximately a 45-degree angle relative to the drive assembly 530 when the drive assembly 530 is neutral, in a static, zero-pitch position, referenced against zero-degrees at the top of the drive assembly 530, or its 12 o'clock position. This position of the hydraulic cylinder 592 will permit rapid vertical adjustment of the thrust vector angle with sufficient "under-trim" (also referred to as "in-trim" or "down-trim") without possibly interfering or limiting the drive's "up-trim" (also referred to as "out-trim") travel which in the case of a surface-piercing mode can be a very aggressive pitch angle depending on the drive assembly's 530 specific design and pivot point. Forward mounting the pitch control hydraulic cylinder 592 also gives naval architects the freedom to leave the transom open, notched or tunneled aft of the drive's hull-cavity 525. The open transom will allow for higher performance vessel designs where a configuration of the drive assembly 530 is optimized for a surface piercing mode.

In one aspect, a pitch actuator bracket 595 is attached to the upper unit 535 of the drive assembly 530 for securing the hydraulic cylinder's push-pull rod 594 to the drive assembly 530. The base of the hydraulic cylinder 592 will be securely mounted to the previously described hull-cavity 525 attachment point. The marine drive system 510 may be steerable, as well as pitch articulated. Power is transferred from the main horizontal input shaft 570 centered within the trunnion hub 550, to the main drive assembly shaft 600 centered vertically down through both the upper and lower units 535, 540. The main drive assembly shaft 600 may be linked to a horizontal propeller shaft located in the lower unit 540 of the drive assembly 530. Right-angle transfer is accomplished with bevel gears. A hollow steering spindle 610 is suspended within the upper unit 535 of the drive assembly 530 by an upper and a lower bearing set. The steering spindle 610 is bolted securely to the lower unit 540 of the drive assembly 530. The steering spindle 610 includes a gear 515 coupled to the spindle 610. The gear 515 is in meshing contact with a worm gear assembly to rotate the spindle 610 and the lower unit 540 of the drive assembly 530. As stated above, the lower unit 540 of the drive assembly 530 is rotatable through 360 degrees. The worm gear assembly 620 is coupled to the steering spindle 610 on the peripheral circumference of the gear 615. The worm gear assembly 620 is mounted within a boss provided on the upper unit 535 of the drive assembly 530. A hydraulic motor mounted to the upper unit 535 of the drive assembly 530 turns the worm gear assembly 620, which in turn rotates only the lower unit 540 of the drive assembly 530. It should be realized that alternative gear actuation assemblies and powering mechanisms may be used by the present invention. The worm gear assembly 520, with hydraulic motor actuation, permits rotation of the lower unit 540 of the drive assembly 550 independently of the movement of the vertical driveshaft 600 driven by the vessel's engines providing a simultaneous steerable, pitch articulating drive assembly 530.

Figure 11:
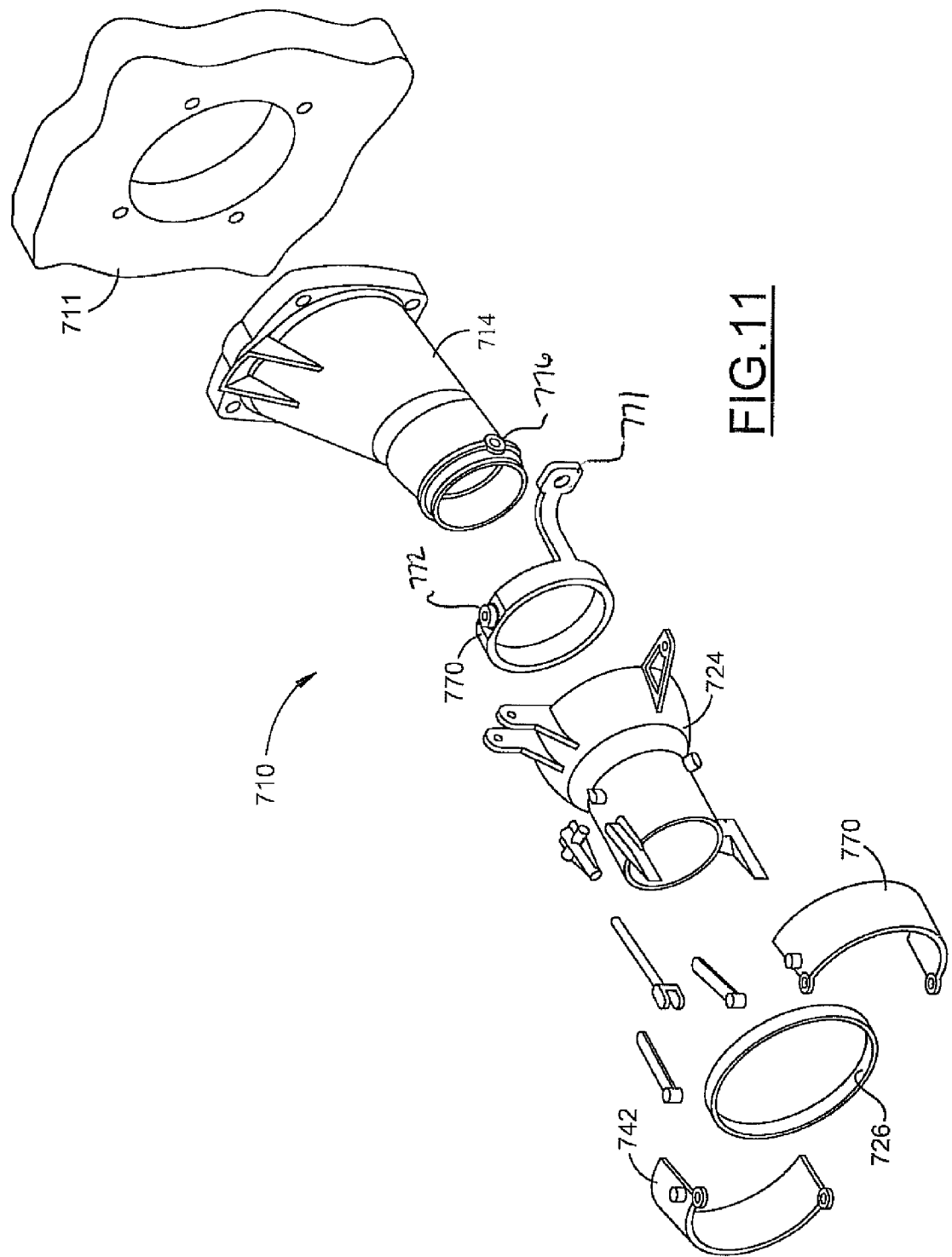
FIG. 11 is a perspective view of an embodiment of a water jet propulsory mechanism capable of simultaneous pitch (transverse) axis and steer (vertical) axis inputs.

Referring to FIG. 11, there is shown another embodiment of a primary propulsion device 16 that includes a water jet drive 710. In the depicted embodiment, there is shown a discharge nozzle 714 having a nozzle housing 724 and ring 726. The ring 726 forms an annulus with a nozzle housing 724. Water passes through the annulus in which the cross sectional area is decreased in the axial direction to accelerate the flow as it passes through the exit plane in the same direction as the flow from the discharge or exhaust nozzle 714. The additional mass flow of the water through the annulus mixes with the flow from the jet discharge or exhaust nozzle 714 resulting in thrust augmentation. The extent of the thrust augmentation achieved is determined by the cross section area and axial length of the annulus and the velocity of the flow from the discharge or exhaust nozzle 714.

The housing 724 may also be movably coupled to the vessel 711 for steering and/or vertical pitch control. In one aspect, the housing may be moveable to allow for simultaneous steering and pitch control. In the illustrated embodiment, the housing 724 may be pivotally coupled to a frame 770, for movement about a first pivot 772 relative to the frame 770. The frame 770 is, in turn, pivotally coupled to a fixed portion of the vessel 711 for movement of the housing 724 and frame 770 together about a second pivot 776 relative to the fixed portion of the vessel. Cables may be used for controlling the movement of the housing 724 about the first 772 and second pivots 776. In one aspect, the housing 724 may be manipulated to control damping of the attitude and motion of the vessel in any of the pitch, roll or yaw axes in both the forward and reverse directions. The frame 770 includes a tab 771 extending off of the frame 770 and isolates movement in the steering and pitch axis to prevent control loop problems when controlling movement.

Figure 12:
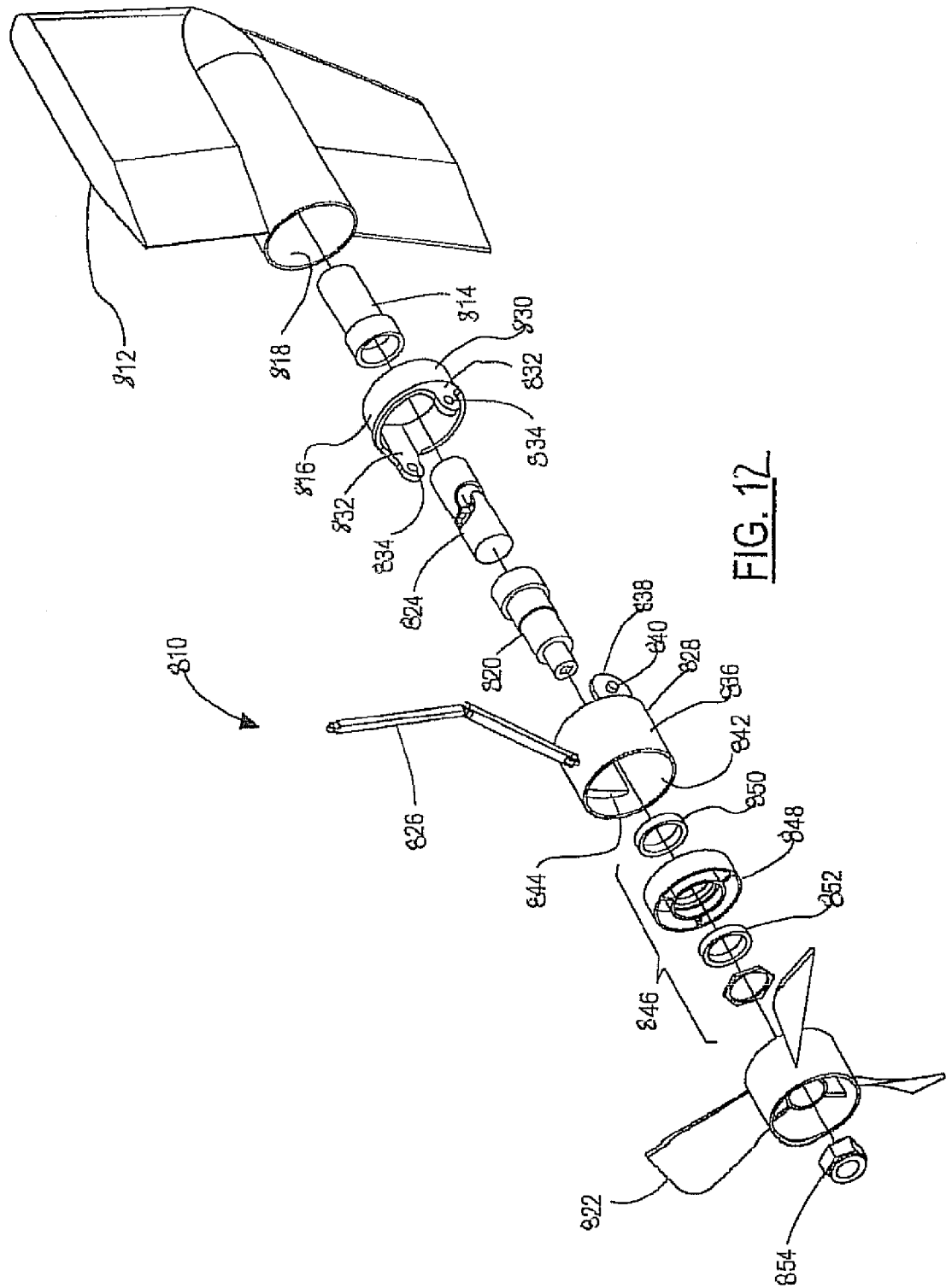
FIG. 12 is a perspective view of an embodiment of a primary marine propulsory mechanism including an adjustable propeller capable of simultaneous pitch (transverse) axis and steer (vertical) axis inputs.

Referring to FIG. 12, there is shown another embodiment of a primary propulsion mechanism 16. In the depicted embodiment, the adjustable propeller assembly 810 includes a propeller housing 812, a drive shaft 814, and a first pivot member 816 attached to the propeller housing 812. The propeller housing 812 may include a generally hydrodynamic structure associated with the foot of an outboard motor, although other propulsion devices such as inboard/outboard and other propulsions devices may also be utilized. The adjustable propeller assembly may include various exhaust routing designs including through the hub exhaust, over the hub exhaust, a combination of through and over the hub exhaust, and non-through the hub designs where the exhaust is routed to a different location than the propeller 822. The propeller housing 812 may have a generally circular opening 818 allowing passage of the drive shaft 814 and to receive the first pivot member 816.

The adjustable propeller assembly 810 may also include a propeller shaft 820 linked with a propeller 822. A coupling member 824 may be connected to the drive shaft 814 and the propeller shaft 820 allowing for the coupling member 824 to pivotally transmit a torque from the drive shaft 814 to the propeller shaft 820. An actuator 826 may be connected to a second pivot member 828. The actuator 826 moves the second pivot member 828 and propeller 822 about the first pivot member 816 to dynamically adjust a thrust vector of the propeller 822 relative to the propeller housing 812.

The first pivot member 816 may include a generally cylindrical body 830 having a pair of tabs 832 including slots 834 formed in the tabs 832. In one aspect, the first pivot member 816 may be inserted within the opening 818 formed in the propeller housing 812 and secured relative to the propeller housing 812. The drive shaft 814 passes through the first pivot member 816 and is connected with the coupling member 824. In one aspect, the drive shaft 814 and coupling member 824 may include splines or may otherwise be connected together. Similarly, the propeller shaft 820 may also include splines that mate with corresponding splines formed on the coupling member 824.

The second pivot member 828 may include a generally cylindrical body 836 having a pair of tabs 838 including bosses 840 formed thereon. The bosses 840 may be disposed within the slots 834 of the first pivot member 816 allowing pivotal movement of the second pivot member 828 about a vertical axis relative to the propeller housing 812. The second pivot member 828 may include an inner surface 842 having a ledge formed thereon. The coupling member 824 and propeller shaft 820 pass through the second pivot member 828 for connecting with the propeller 822.

The adjustable propeller assembly 810 may include a bearing assembly 846 disposed in the second pivot member 828. The bearing assembly 846 may include a bearing retainer 848 and first and second bearings 850, 852 disposed in the bearing retainer 848. The bearing retainer 848 may be positioned to engage the ledge 844 formed on the inner surface 842 of the second pivot member 828.

The propeller shaft 820 may include a stepped design to locate the bearings 850, 852 relative to the propeller shaft 820 as well as position the propeller 822 relative to the propeller shaft 820. The propeller 822 may be attached to the propeller shaft 820 utilizing a nut 854 that attaches to a corresponding thread formed on the propeller shaft, or may otherwise be attached to the propeller shaft 820.

The adjustable propeller assembly 810 may be adjusted wherein a thrust vector of the propeller 822 is controlled relative to the propeller housing. The drive shaft 814 extending from the opening 818 of the propeller housing 812 is linked to the propeller shaft 820 through the coupling member 824. The propeller 822 is linked with the propeller shaft 820, as described above. The actuator 826 connected to the second pivot member 828 may be energized to change a position of the second pivot member 828 relative to the propeller housing 812. As described above, the second pivot member 828 is pivotally connected to the first pivot member 816 that is attached to the propeller housing 812. As the second pivot member 828 is adjusted, the torque applied from the drive shaft 814 to the propeller shaft 820 is delivered through the coupling member 824 allowing for transmission of the rotary motion at various angles as the second pivot member 828 is adjusted. In turn, the propeller 822 linked with the second pivot member 828 is adjusted such that a thrust vector of the propeller is changed. In one aspect, the propeller 822 is adjustable at rates necessary for damping motion in the pitch, roll and yaw axes of a vessel.

In operation, the marine vessel control system 14 may include any of the primary propulsory mechanisms 16 described above that provide a thrust vector 18 and are movably attached to the vessel Additionally, actuators such as, outdrives, sterndrives, Arneson drives and water jet drives may also be utilized. A user inputs the desired control parameters into the input device 30 that is coupled with the central control computer 26. The attitude sensor 24 provides a signal indicating the attitude of the vessel in any of the pitch, roll and yaw axes of the vessel. The central control computer 26 provides a signal to the servo control 22 linked with the actuating system 20 that is coupled with the primary propulsory mechanism 16 or vessel hydrodynamic effector 60. The primary propulsion mechanism's thrust vector 18 and the position of the hydrodynamic effector 60 are controlled such that the attitude, stability and motion damping in any of the pitch, roll and yaw axes of the vessel are controlled in response to the input from the user. In one aspect, the primary propulsion thrust vector may be dynamically adjusted about the pitch axis in both a negative and positive pitch trim about the axis. Additionally, the primary propulsion thrust vector may be dynamically adjusted about the yaw axis. In a further aspect, the vessel may include a plurality of primary marine propulsion mechanisms that may be differentially and dynamically independently adjusted to control the vessel attitude, stability and motion damping as described above.

In one aspect, the vessel control system can integrate with, and, if required, electronically control other steering devices such as conventional rudders, steerable drives, etc.

In another aspect, the marine vessel control system may allow for unusual attitude maneuvering. Unusual attitude maneuvering results from differential control of primary marine propulsory mechanism thrust vectors and hydrodynamic effectors which may allow for the adjustment of the attitude of a vessel not capable of being performed by prior art propulsion systems. One example of an unusual attitude maneuver is a controlled list that maintains a desired angle to the vessel.

Additionally, the vessel control system may be utilized to induce a flat turn that may be accomplished by instructing the vessel control system to maintain a neutral or level deck attitude while turning. A flat turn restricts roll to 0 degrees. The marine control system 14 provides the capability to achieve unnatural vessel attitudes and maneuvers. In this context, 'unnatural' means the achievement of vessel attitude and behavior not otherwise possible without the control system operating and not as would naturally occur as a normal consequence of the vessel hull shape and propulsion mechanism alone. This "decoupled maneuvering" includes examples such as: flat turns, pitch-level and shortened-duration transition from low speed operation to fully planing operation, and forced listing. The flat turn results in a reduction in wetted surface area as compared to what a similar vessel would experience as a result of leaning into turns and forcing a larger area of the hull into the water. Increasing wetted surface area for an extended period during a turn results in speed loss. The vessel control system eliminates leaning in turns and, as a result, does not experience the same level of speed loss. Additionally, the flat turn may result in a significant reduction in turning radius.

Additionally the vessel control system provides further improvements in relation to the prior art including: a 100% reduction in time and distance to plane from idle at maximum engine RPM; accomplished by simultaneously pushing the stern forward and up into an immediate planing attitude, with the vertical component of the propulsion thrust vector substituting for the planning lift component at speeds well below that where the vessel would naturally be fully planning on hull hydrodynamic lift alone; zero bowrise during transition to plane from idle that enables an operator an unobstructed forward vision; improved ride comfort and overall vessel stability in all operational conditions resulting from active motion damping and rotational axes control; reduced operator/passenger fatigue resulting from improved ride comfort and overall vessel stability.

Additionally, the marine vessel control system allows for the ability to expand a motor's typical power-matching potential. Utilizing the vessel control system, a motor, traditionally too small for a particular vessel's horsepower requirements, can produce unexpectedly high "installed" performance. This is due to the reduction in the hump that exists in the drag versus speed characteristic of and planning hull designs, occurring in the region of transition between displacement and planning operation. The magnitude of the transition drag hump often defines the minimum installed power requirement and the vectoring of thrust accomplished by the vessel control system significantly reduces the peak magnitude of that drag hump.

Further, the vessel control system allows for the tolerance for weight distribution issues aboard a vessel. Temporarily adding 1,000 pounds to the transom of the technology demonstrator during testing has no impact on its overall performance. Similarly, the shifting of weight(s) from port to starboard would normally cause a change in the running list attitude of the vessel; with this marine control system active, that list is reduced or eliminated entirely.

The invention has been described in an illustrative manner. It is therefore to be understood that the terminology used is intended to be in the nature of words of description rather than of limitation. Many modifications and variations of the invention are possible in light of the above description. Thus, within the scope of the appended claims, the invention may be practiced or applied other than as specifically described.

The invention claimed is:

1. A control system comprising:
an attitude sensor configured to generate a signal indicative of changes in an attitude of a marine vessel due to an environmental input to the marine vessel, wherein the attitude of the marine vessel changes at a first rate based on the environmental input;
a first propulsion mechanism attached to the marine vessel and having a first thrust vector;
an actuator system configured to actuate the first propulsion mechanism at a second rate, wherein the second rate is greater than the first rate, and wherein the actuating of the first propulsion mechanism at the second rate changes a direction of the first thrust vector; and
a computer configured to, based on the signal and in response to the changes in the attitude, damp angular motion of the marine vessel to reduce the first rate including controlling the actuator system to change a first direction of the first thrust vector at the second rate to stabilize the marine vessel.

2. The control system of claim 1, wherein the computer is configured to adjust the attitude of the marine vessel to damp pitch motion of the marine vessel.

3. The control system of claim 1, wherein the computer is configured to adjust the attitude of the marine vessel to damp roll motion of the marine vessel.

4. The control system of claim 1, wherein the computer is configured to adjust the attitude of the marine vessel to damp yaw motion of the marine vessel.

5. The control system of claim 1, wherein the first propulsion mechanism comprises a propeller or a water jet.

6. The control system of claim 1, wherein the second rate is at least a predetermined number of times greater than the first rate.

7. The control system of claim 1, further comprising a second propulsion mechanism having a second thrust vector, wherein:
the actuator system is configured to actuate the second propulsion mechanism;
the computer is configured to, based on the signal and in response to the changes in the attitude, damp the angular motion of the marine vessel to reduce the first rate including controlling the actuator system to differentially actuate (i) the first propulsion mechanism at the second rate to adjust the first direction of the first thrust vector, and (ii) the second propulsion mechanism at a third rate to adjust a second direction of the second thrust vector; and
the third rate is greater than the first rate.

8. The control system of claim 7, wherein the computer is configured to, via the actuator system, (i) actuate the first propulsion mechanism such that the first thrust vector is at a positive pitch angle relative to a first pitch axis, and (ii) actuate the second propulsion mechanism such that the second thrust vector is at a negative pitch angle relative to a second pitch axis.

9. The control system of claim 7, wherein the computer is configured to, via the actuator system, (i) actuate the first propulsion mechanism such that the first thrust vector is at a positive yaw angle relative to a first yaw axis of the marine vessel, and (ii) actuate the second propulsion mechanism such that the second thrust vector is at a negative yaw angle relative to a second yaw axis.

10. The control system of claim 7, wherein the computer is configured to, via the actuator system, actuate the first propulsion mechanism independent of the second propulsion mechanism.

11. The control system of claim 1, wherein the computer is configured to, while controlling the actuator system to adjust the attitude of the marine vessel, attenuate a value of a resonant response of the marine vessel.

12. The control system of claim 1, further comprising a first hydrodynamic effector attached to the marine vessel, wherein:
the computer is configured to, based on the signal and in response to the changes in the attitude, damp the angular motion of the marine vessel to reduce the first rate including controlling the actuator system to change a first position of the first hydrodynamic effector at a third rate to stabilize the marine vessel;

the third rate is greater than the first rate; and the first hydrodynamic effector comprises a trim tab, interceptor, or a hydrofoil.

13. The control system of claim 12, further comprising a second hydrodynamic effector attached to the marine vessel, wherein:

the computer is configured to, based on the signal and in response to the changes in the attitude, damp the angular motion of the marine vessel to reduce the first rate including controlling the actuator system to change a second position of the second hydrodynamic effector at a fourth rate to stabilize the marine vessel;

the fourth rate is greater than the first rate; and the second hydrodynamic effector comprises a trim tab, interceptor, or a hydrofoil.

14. The control system of claim 13, further comprising a second propulsion mechanism attached to the marine vessel and having a corresponding second thrust vector, wherein:

the actuator system is configured to actuate the second propulsion mechanism; and the computer is configured to, while adjusting the attitude of the marine vessel and damping the angular motion of the marine vessel, control the actuator system to (i) adjust pitch of the marine vessel by changing the first direction of the first thrust vector and a second direction of the second thrust vector, and (ii) adjust roll of the marine vessel by changing the first position of the first hydrodynamic effector and the second position of the second hydrodynamic effector, or (a) adjust pitch of the marine vessel by changing the first position of the first hydrodynamic effector and the second position of the second hydrodynamic effector, and (b) adjust roll of the marine vessel by changing the first direction of the first thrust vector and the second direction of the second thrust vector.

15. A control system comprising:

an attitude sensor configured to generate a signal indicative of an attitude of a marine vessel;

a first propulsion mechanism attached to the marine vessel and having a corresponding first thrust vector;

a second propulsion mechanism attached to the marine vessel and having a corresponding second thrust vector;

an actuator system configured to actuate the first propulsion mechanism and the second propulsion mechanism; and a computer configured to, based on the signal and during a turn of the marine vessel, control the actuator system to differentially actuate the first propulsion mechanism and the second propulsion mechanism, wherein the differential actuation of the first propulsion mechanism and the second propulsion mechanism comprises changing the first thrust vector or the second thrust vector to maintain a roll angle of the marine vessel at a predetermined roll angle throughout at least a portion of the turn of the marine vessel.

16. The control system of claim 15, wherein the computer is configured to, based on the signal and while adjusting yaw motion of the marine vessel, control the actuator system to differentially actuate the first propulsion mechanism relative to the second propulsion mechanism such that the first propulsion mechanism is at a positive angle relative to a first pitch axis and the second propulsion mechanism is at a negative angle relative to a second pitch axis.

17. The control system of claim 15, wherein the predetermined roll angle is 0 degrees such that the turn is a flat turn.

18. The control system of claim 15, further comprising a plurality of hydrodynamic effectors attached to the marine vessel, wherein the computer is configured to, based on the signal and during the turn, control the actuator system to differentially actuate the plurality of hydrodynamic effectors to maintain the roll angle of the marine vessel at the predetermined roll angle throughout the at least the portion of the turn of the marine vessel.

19. The control system of claim 18, wherein:

the signal is indicative of changes in the attitude due to an environmental input to the marine vessel, wherein the attitude of the marine vessel changes at a first rate based on the environmental input;

the computer is configured to, during the turn, (i) actuate the first propulsion mechanism or the second propulsion mechanism at a second rate, and (ii) actuate one of the plurality of hydrodynamic effectors at a third rate; and the second rate and the third rate are each greater than the first rate.

20. A control system comprising:

an attitude sensor configured to generate a signal indicative of an attitude of a marine vessel;

a propulsion mechanism attached to the marine vessel and having a corresponding thrust vector;

a plurality of hydrodynamic effectors attached to the marine vessel;

an actuator system configured to actuate the propulsion mechanism and each of the plurality of hydrodynamic effectors, wherein the actuating of the propulsion mechanism changes a direction of the thrust vector; and a computer configured to, based on the signal and during a turn of the marine vessel, control the actuator system to actuate the propulsion mechanism and differentially actuate the plurality of hydrodynamic effectors, wherein the actuation of the propulsion mechanism and the differential actuation of the plurality of hydrodynamic effectors comprise changing the thrust vector and positions of the plurality of hydrodynamic effectors to maintain a roll angle of the marine vessel at a predetermined roll angle throughout at least a portion of the turn of the marine vessel.

21. A control system comprising:

an attitude sensor configured to generate a signal indicative of changes in an attitude of a marine vessel due to an operator input or a change in a weight distribution of the marine vessel, wherein the attitude of the marine vessel changes at a first rate based on the operator input or the change in the weight distribution of the marine vessel;

a first propulsion mechanism attached to the marine vessel and having a first thrust vector;

an actuator system configured to actuate the first propulsion mechanism at a second rate, wherein the second rate is greater than the first rate, and wherein the actuating of the first propulsion mechanism at the second rate changes a direction of the first thrust vector; and a computer configured to, based on the signal and in response to the changes in the attitude, damp angular motion of the marine vessel to reduce the first rate including controlling the actuator system to change a first direction of the first thrust vector at the second rate to stabilize the marine vessel.

22. The control system of claim 21, wherein the change in weight distribution of the marine vessel is due to a shift in a load aboard the marine vessel.

23. The control system of claim 21, further comprising a plurality of hydrodynamic effectors,
   wherein the computer is configured to, in damping angular motion of the marine vessel to reduce the first rate and based on the signal and in response to the changes in the attitude, control the actuator system to change the first direction of the first thrust vector and differentially actuate the plurality of hydrodynamic effectors to stabilize the marine vessel.

* * * * *